(12) United States Patent
Pasternak et al.

(10) Patent No.: US 9,926,978 B2
(45) Date of Patent: Mar. 27, 2018

(54) PLAIN BEARING COMPOSITE MATERIAL

(71) Applicant: KS Gleitlager GmbH, St. Leon-Rot (DE)

(72) Inventors: Axel Pasternak, Bad Schoenborn (DE); Rolf Reinicke, Bad Schoenborn (DE); Ruediger Bickle, Reilingen (DE); Corina Steck, Kusterdingen (DE); Andreas Schmid, Gaertringen (DE); Frank Richter, Eningen unter Achalm (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 117 days.

(21) Appl. No.: 14/399,533

(22) PCT Filed: Apr. 30, 2013

(86) PCT No.: PCT/EP2013/058966
§ 371 (c)(1),
(2) Date: Nov. 7, 2014

(87) PCT Pub. No.: WO2013/171064
PCT Pub. Date: Nov. 21, 2013

(65) Prior Publication Data
US 2015/0133351 A1 May 14, 2015

(30) Foreign Application Priority Data
May 18, 2012 (DE) .................. 10 2012 208 345

(51) Int. Cl.
*F16C 33/20* (2006.01)
*F16C 33/04* (2006.01)

(52) U.S. Cl.
CPC ............ *F16C 33/201* (2013.01); *F16C 33/20* (2013.01); *F16C 33/205* (2013.01)

(58) Field of Classification Search
CPC .............. C10M 107/04; C10M 125/04; C10M 2201/066
USPC .................................................. 508/106, 108
See application file for complete search history.

(56) References Cited

U.S. PATENT DOCUMENTS

| 2009/0074339 A1* | 3/2009 | Ito .............................. F02K 9/60 384/493 |
| 2011/0076096 A1* | 3/2011 | Slayne .................... F16C 27/02 403/372 |
| 2011/0160378 A1* | 6/2011 | Kim ......................... C08K 7/14 524/504 |

FOREIGN PATENT DOCUMENTS

| DE | 10 2007 016 713 | 10/2008 |
| JP | 2004/346282 | 12/2004 |
| WO | WO 2008/128579 | 10/2008 |
| WO | WO 2011/039095 | 4/2011 |

* cited by examiner

Primary Examiner — Prem C Singh
Assistant Examiner — Francis C Campanell
(74) Attorney, Agent, or Firm — Paul Vincent

(57) ABSTRACT

A plain bearing composite material (2), has a supporting layer (4), optionally a porous substrate layer (6), in particular made of bronze, and a sliding layer material (8) made of a matrix-forming thermoplastic plastic material (10) and fillers (12) accommodated therein, wherein the sliding layer material (8) has a fraction of 1-40 vol % wollastonite as a mineral filler (14) and at least half of the wollastonite is present with needle-shaped modification.

6 Claims, 2 Drawing Sheets

PLAIN BEARING COMPOSITE MATERIAL

This application is the national stage of PCT/EP2013/058966, filed Apr. 30, 2013 and also claims Paris convention priority from DE 10 2012 208 345.5, filed May 18, 2012.

BACKGROUND OF THE INVENTION

The invention concerns a plain bearing composite material comprising a supporting layer, optionally a porous carrier layer, in particular made of bronze, and a sliding layer material made of a matrix-forming thermoplastic plastic material and fillers accommodated therein.

Plain bearing composite materials and plain bearings that are produced therefrom and comprise a supporting layer and a plastic sliding layer are well known, in particular in automotive applications. They are used for supporting shafts or shaft journals in cylindrical or bushing-shaped, in particular collar-bushing-shaped bearings. They are also used for spherically designed bearing arrangements. Plain bearing composite materials are typically produced in the form of an endless unit, thereby forming a rollable flat material band. For producing plain bearing elements, blank sections are cut off from an endlessly supplied flat material band of the plain bearing composite material and are then shaped into a bushing or bowl shape. Bushing-shaped plain bearing elements are typically formed having a butt joint which is substantially at least almost completely closed when the plain bearing elements are pressed into a bearing seat.

The fillers accommodated in the thermoplastic matrix of the sliding layer material are tribologically effective substances that have both supporting and wear-reducing properties as well as lubricating properties.

The sliding layer material may be extensively applied to the supporting layer that may be formed, in particular, of steel or aluminium. It could e.g. be laminated, cast or injected. It is, however, also feasible to use a three-dimensionally porous carrier layer that is e.g. porously sintered onto the supporting layer, wherein in this case, the sliding layer material including fillers is impregnated into the open-pored porous carrier layer from the side facing the later sliding partner, thereby improving the retention properties. It thereby typically forms a projection of preferably 50-500 μm past the material of the carrier layer.

It is the underlying purpose of the present invention to further improve a plain bearing composite material of the above-mentioned type with regard to the load-bearing capacity of the sliding layer material.

SUMMARY OF THE INVENTION

In accordance with the invention, this object is achieved in a plain bearing composite material of the above-mentioned type in that the sliding layer material comprises a percentage of 1 to 40 vol. % of wollastonite as mineral filler and that at least half of the wollastonite is present in the form of a needle-shaped modification.

In accordance with the present invention, mineral filler in the form of wollastonite, i.e. calcium silicate, $CaSiO_3$ or to be more precise $Ca_3[Si_3O_9]$ of the claimed amount has been found to be particularly advantageous from a tribological point of view. It has moreover turned out that the use of wollastonite in a needle-shaped modification further improves the load-bearing capacity of the inventive plain bearing composite material.

Wollastonite in its needle-shaped configuration can be defined such that a dimension c of a wollastonite particle is at least four times, in particular at least five times as large as two further dimensions a and b. In case of a plate-shaped configuration, a dimension a is smaller than 0.3 times the other dimensions b and c, wherein the dimension b/c is between 0.7 and 1.3. In contrast thereto, granular or block-shaped wollastonite comprises particles, the three dimensions of which a, b and c each relative to each other, i.e. a/b, a/c and b/c, respectively, are between 0.7 and 1.3. The above-mentioned dimensions a, b and c are thereby measured along axes that are perpendicular to each other.

Wollastonite in its needle-shaped modification is e.g. available as TREMIN® 939-600 AST and in its block or granular modification as TREMIN® 283-800 AST from Quarzwerke GmbH, Frechen, Germany. This needle-shaped wollastonite can be characterized as follows: average needle length $L_{50}=21$ μm ($L_{90}=49$ μm, $L_{10}=9$ μm). This needle-shaped wollastonite is surface-treated with aminosilane. The granular wollastonite has a $D_{95}$ value of 8 μm and a $D_{50}$ value of 25 μm.

The invention further proposes a percentage of wollastonite in needle-shaped modification of at least 60 vol. %, in particular, at least 70 vol. % and moreover, in particular at least 80 vol. %. It may also be advantageous to provide a larger percentage of wollastonite in needle-shaped modification and a smaller percentage of wollastonite in granular or block-shaped modification. The percentage of needle-shaped wollastonite is thereby advantageously 3 to 5 times the percentage of granular wollastonite.

In one preferred embodiment of the inventive plain bearing composite material, the percentage of wollastonite in the sliding layer material is 1 to 30 vol. % and, in particular, 2 to 25 vol %.

In accordance with a further inventive idea, which is per se independent, the sliding layer material moreover comprises a percentage of 0.2 to 20 vol. %, 0.5 to 20 vol. %, in particular 0.5 to 15 vol. %, in particular 0.5 to 10 vol. %, in particular 0.5 to 5 vol. % of a further filler selected from the class of metal sulfides. In accordance with the invention, it has turned out that the performance of wollastonite can be increased unexpectedly in cooperation with metal sulfide as a further filler. The load-bearing and wear-reducing properties of the plain bearing composite material are increased and the coefficient of friction is also reduced. Molybdenum disulfide ($MoS_2$), tungsten disulfide ($WS_2$), copper sulfide (CuS) and/or zinc sulfide (ZnS) are proposed as advantageous fillers from the class of metal sulfides.

It may also be advantageous for the sliding layer material to also contain tribologically effective fillers, selected from PTFE, graphite, ceramic substances such as, in particular, hexagonal boron nitride or titanium dioxide, carbon fibers, aramide fibers, aramide powder, barium sulfate.

The percentage of all fillers including the wollastonite percentage is preferably limited to maximally 50 vol. %.

In the inventive plain bearing composite material, the thermoplastic plastic material is preferably selected from polyphthalamide (PPA), polyamide (PA), polyetheretherketone (PEK), polyethylene sulfone (PES), polyvinylidene fluoride (PVDF), polyphenylene sulfide (PPS), polyoxymethylene (POM), polyethylene (PE), polyimide (PI), liquid crystal polymer (LCP), polyphenylene ether (PPE), polyester as well as mixtures thereof.

In one particularly preferred embodiment, the thermoplastic plastic material is predominantly made of PPA, i.e. the percentage of PPA in the thermoplastic plastic material is preferably at least 50 vol. %, in particular, at least 60 vol. %, in particular, at least 70 vol. % and moreover, in particular at least 80 vol. %. A plain bearing composite material of this type has proven to be advantageous in view of a large number of applications in connection with wollastonite. Although a thermoplastic matrix of predominantly PPA does not show the high-temperature resistance of a material comprising a matrix of PEEK, it is still considerably superior to the load-bearing capacity of PVDF-based plastic sliding layers.

In one further particularly preferred embodiment, the sliding layer material comprises PPA and tungsten disulfide or molybdenum sulfide as a metal sulfide. The preferred composition of the sliding layer material is, in particular, 70 to 80 vol. % of PPA, 15 to 25 vol. % of wollastonite and 2 to 10 vol. % of $WS_2$ or $MoS_2$.

The invention also concerns a plain bearing for accommodating a sliding partner having the shape of a shaft or pin, wherein the plain bearing is produced from an inventive plain bearing composite material, in particular, using a roll-bending method.

Further features, details and advantages of the invention can be extracted from the enclosed claims and the drawing and the following description of a preferred embodiment of the inventive plain bearing composite material. In the drawing:

DESCRIPTION OF THE PREFERRED EMBODIMENT

Figure 1:
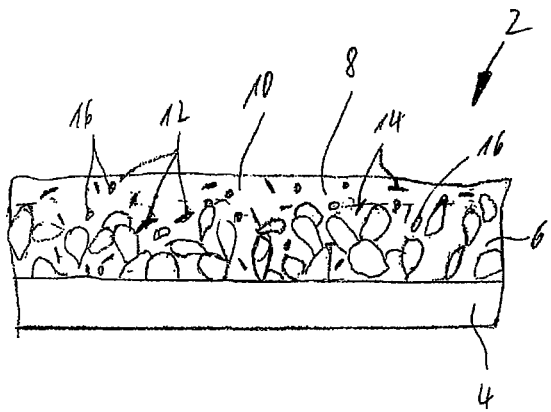
FIG. 1 shows a schematic sectional view of an inventive plain bearing composite material.

The plain bearing composite material 2 illustrated in FIG. 1 comprises a metallic supporting layer 4, in particular of steel, and an (optional) porous carrier layer 6, in particular of bronze, which is, in particular, a sintered layer, as well as a sliding bearing material 8 of a matrix-forming plastic material 10 and fillers 12 accommodated therein. In accordance with the invention, the fillers 12 comprise wollastonite 14 with a percentage of 1 to 40 vol. % relative to the sliding layer material 8, at least half the percentage of which is present in the form of a needle-shaped modification. Further fillers are advantageously provided which may preferably comprise metal sulfides 16.

Figure 3A:
FIGS. 3a, b, c show a schematic view (not true to scale) classifying the wollastonite into different modifications.
Figure 3B:
Figure 3C:
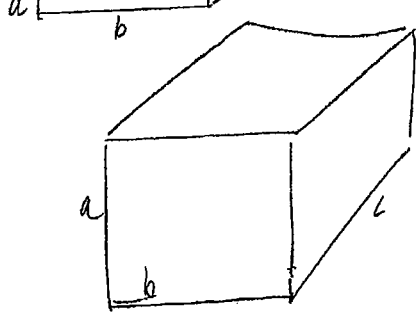

FIGS. 3a, b, c show a purely schematic view, which is not true to scale, classifying the wollastonite into different modifications on the basis of ratio ranges of mutually perpendicular dimensions a, b, c as stated above.

In one preferred embodiment of the inventive plain bearing composite material, the thermoplastic plastic material or polymer is made of PPA. In the following tests, PPA of the trademark VESTAMID® Htplus M1000 natur was used as matrix-forming thermoplastic polymer, which is available from EVONIK Degussa GmbH, Essen, Germany. Wollastonite of needle-shaped and also granular modification in accordance with the above-mentioned type and trademark was used as a mineral filler. Molybdenum disulfide and tungsten disulfide were used as preferred fillers from the class of metal sulfides.

The following plain bearing composite materials were produced, from which rolled bushings were manufactured and used for comparison tests. The plain bearing composite materials all have the construction described in connection with FIG. 1, wherein the sliding layer material 10 projects past the porous carrier layer 6 by approximately 150 µm. $WS_2$ was used as the filler from the class of metal sulfides. The composition of the sliding layer material was as follows:

EXAMPLE 1

90 vol. % PPA
10 vol. % wollastonite in needle-shaped modification

EXAMPLE 2

89 vol. % PPA
10 vol. % wollastonite in needle-shaped modification
1 vol. % $WS_2$

EXAMPLE 3

89 vol. % PPA
5 vol. % wollastonite in needle-shaped modification
5 vol. % wollastonite in granular modification
1 vol. % $WS_2$

EXAMPLE 4

93 vol. % PPA
7 vol. % wollastonite in granular modification

Figure 2:
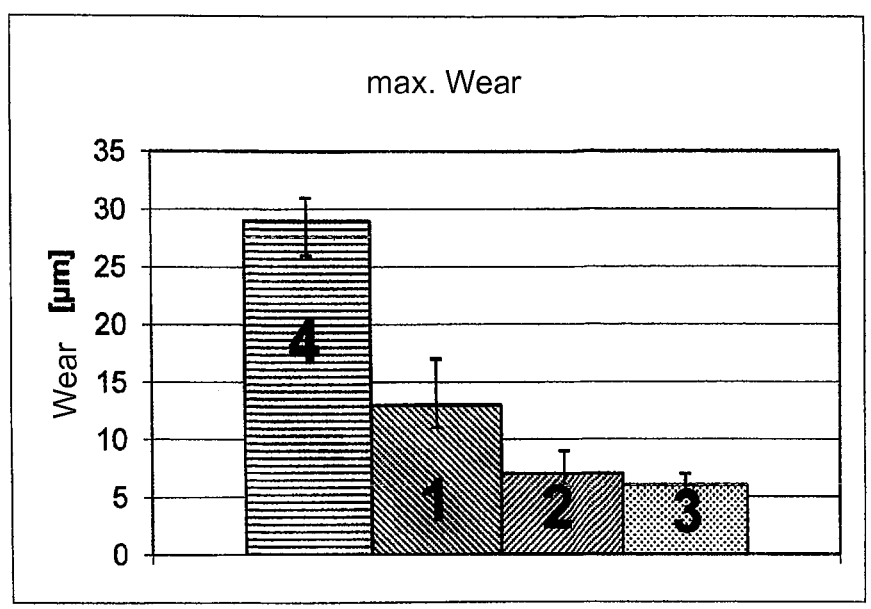
FIG. 2 shows the results of wear tests on different plain bearing composite materials.

The following comparative measurements were carried out: Wear test on a bearing test rig: The rolled bushings of plain bearing composite material having a width of 20 mm and an inner diameter of 30 mm are pressed into a bushing accommodating body. They run relative to a steel shaft. A load perpendicular to the shaft can be preset or varied via the bushing accommodating body. The test parameters are as follows:

Sliding speed: 0.16 m/sec
Temperature: 30° C.
Media lubrication: V-oil
Oil pressure: 2 bar (supplied via the bushing accommodating body)
Load increase in steps of 0.6 kN up to a maximum load of 30 kN
Dwell time: 900 sec/step After the test run with all steps, the bushing is measured and the wear is determined in µm. To this end, the wear is determined at the load-bearing peak structures of the bushing on both sides at a separation of 3 mm from the bushing edge, taking the average value thereof. The average value is again determined from the measured values of three bushings. The wear is shown in the test results of FIG. 2. The increase in performance that can be achieved by using needle-shaped wollastonite in comparison with using granular wollastonite is clearly shown. The advantageous effect of $WS_2$ as metal sulfide is also obvious.

We claim:
1. A plain bearing having a plain bearing composite material, wherein the plain bearing composite material comprises:
   a lower supporting layer;
   an intermediate carrier layer having open-pores and made of bronze sintered onto an upper side of said supporting layer; and
   a sliding layer material comprising a matrix-forming thermoplastic plastic material and fillers, said thermoplastic plastic material and said fillers being impregnated into and completely filling said open-pores of said carrier layer, said sliding layer material comprising wollastonite as a mineral filler, with at least half of said wollastonite being present in a form of a needle-shaped modification, wherein said sliding layer material comprises 70 to 94 vol. % of polyphthalamide (PPA), 5 to 25 vol. % of wollastonite and 0.5 to 10 vol. % of $WS_2$ or $MoS_2$.

2. The plain bearing of claim 1, wherein at least 60 vol. % of the wollastonite is present in needle-shaped modification.

3. The plain bearing of claim 1, wherein said sliding layer material further comprises a percentage of 0.2 to 20 vol. % of a further filler selected from the group consisting of metal sulfides.

4. The plain bearing of claim 3, wherein said further filler selected from said group of metal sulfides comprises molybdenum disulfide ($MoS_2$), tungsten disulfide ($WS_2$), copper sulfide (CuS) and/or zinc sulfide (ZnS).

5. The plain bearing of claim 1, wherein said sliding layer material further comprises tribologically effective fillers selected from the group consisting of PTFE, graphite, ceramic substances, hexagonal boron nitride or titanium dioxide, carbon fibers, aramide fibers, aramide powder and barium sulfate.

6. The plain bearing of claim 1, wherein a percentage of all fillers, including said wollastonite percentage, is maximally 50 vol. %.

* * * * *